United States Patent
Cox

(10) Patent No.: US 9,195,113 B2
(45) Date of Patent: Nov. 24, 2015

(54) TUNABLE MULTISPECTRAL LASER SOURCE

(71) Applicant: Honeywell International, Inc., Morristown, NJ (US)

(72) Inventor: James A. Cox, New Brighton, MN (US)

(73) Assignee: Honeywell International Inc., Morris Plains, NJ (US)

( * ) Notice: Subject to any disclaimer, the term of this patent is extended or adjusted under 35 U.S.C. 154(b) by 91 days.

(21) Appl. No.: 13/896,142

(22) Filed: May 16, 2013

(65) Prior Publication Data

US 2013/0314703 A1    Nov. 28, 2013

Related U.S. Application Data

(60) Provisional application No. 61/651,568, filed on May 25, 2012.

(51) Int. Cl.
| | |
|---|---|
| *G01J 3/00* | (2006.01) |
| *G02F 1/35* | (2006.01) |
| *G01J 3/10* | (2006.01) |
| *G02F 1/01* | (2006.01) |
| *G02F 1/313* | (2006.01) |
| *G01J 3/433* | (2006.01) |

(52) U.S. Cl.
CPC ............... *G02F 1/3536* (2013.01); *G01J 3/10* (2013.01); *G01J 3/4338* (2013.01); *G02F 1/0147* (2013.01); *G02F 1/3132* (2013.01); *G02F 2203/15* (2013.01); *G02F 2203/56* (2013.01)

(58) Field of Classification Search
CPC ................... G01J 3/10; G02F 1/3536
USPC ............... 356/326; 359/326, 578; 372/20, 94
See application file for complete search history.

(56) References Cited

U.S. PATENT DOCUMENTS

| | | | |
|---|---|---|---|
| 5,305,334 A * | 4/1994 | Margalit et al. ................. 372/32 |
| 6,591,026 B2 * | 7/2003 | Endo et al. ....................... 385/15 |
| 6,636,668 B1 | 10/2003 | Al-hemyari et al. |
| 7,200,308 B2 * | 4/2007 | Hochberg et al. ............. 385/122 |
| 8,660,390 B2 * | 2/2014 | McLaren et al. ................ 385/30 |
| 2003/0123780 A1 * | 7/2003 | Fischer ............................ 385/15 |
| 2003/0231826 A1 * | 12/2003 | Boyd et al. ....................... 385/27 |

(Continued)

FOREIGN PATENT DOCUMENTS

| EP | 1514333 B1 | 8/2006 |
|---|---|---|
| WO | WO-2008/018900 A2 | 2/2008 |

OTHER PUBLICATIONS

Agha et al. "Theoretical and experimental investigation of broadband cascaded four-wave mixing in high-Q microsphere", Optics Express, Aug. 31, 2009, vol. 17, No. 18.*

(Continued)

*Primary Examiner* — Kara E Geisel
*Assistant Examiner* — Dominic J Bologna
(74) *Attorney, Agent, or Firm* — Schwegman Lundberg & Woessner, P.A.

(57) ABSTRACT

An tunable optical frequency comb source includes a linear waveguide having an input leg to couple to a pump laser. A ring microresonator is evanescently coupled to the linear waveguide. The microresonator includes a ring shaped waveguide having a core material with a nonlinear refractive index to provide four-wave mixing to generate a cascade of independent laser beams at frequencies corresponding to the longitudinal modes of the microresonator.

18 Claims, 4 Drawing Sheets

(56) References Cited

U.S. PATENT DOCUMENTS

| | | | |
|---|---|---|---|
| 2004/0136412 A1* | 7/2004 | Jones | 372/20 |
| 2006/0092500 A1* | 5/2006 | Melloni et al. | 359/330 |
| 2007/0263681 A1* | 11/2007 | Yoshitomi et al. | 372/25 |
| 2008/0192373 A1* | 8/2008 | Tomita et al. | 359/892 |
| 2009/0269002 A1* | 10/2009 | Wong et al. | 385/12 |
| 2010/0014094 A1* | 1/2010 | Cole et al. | 356/480 |
| 2010/0296768 A1 | 11/2010 | Wu et al. | |
| 2011/0261363 A1* | 10/2011 | Picque et al. | 356/451 |
| 2012/0256710 A1 | 10/2012 | Chen et al. | |
| 2013/0010351 A1* | 1/2013 | Vermeulen et al. | 359/334 |

OTHER PUBLICATIONS

Foster, Mark A, et al., "Silicon-based monolithic optical frequency comb source", Optics Express, 19(15), (2011), 14233-14239.

Kippenberg, T. J, et al., "Microresonator-Based Optical Frequency Combs", Science, 332(6029), (2011), 555-559.

Okawachi, Yoshitomo, et al., "Octave-spanning frequency comb generation in a silicon nitride chip", Optics Letters, 36(17), (Sep. 1, 2011), 3398-3400.

Turner, Amy C, et al., "Ultra-low power parametric frequency conversion in a silicon microring resonator", Optics Express, 16(7), (2008), 4881-4887.

"United Kingdom Application Serial No. 1309065.9, Combined Search and Examination Report mailed Aug. 30, 2013", 8 pgs.

"United Kingdom Application Serial No. 1309065.9, Response filed Jun. 27, 2014 to Combined Search and Examination Report mailed Aug. 30, 2013", 11 pgs.

Saha, Kasturi, et al., "On-Chip High Repetition Rate Femtosecond Source", *2012 Conference on Lasers and Electro-Optics (CLEO)*, (2012), 2 pgs.

\* cited by examiner

TUNABLE MULTISPECTRAL LASER SOURCE

RELATED APPLICATION

This application claims priority to U.S. Provisional Application Ser. No. 61/651,568 (entitled Tunable Multispectral Laser Source, filed May 29, 2012) which is incorporated herein by reference.

BACKGROUND

Modern gas sensors based on optical absorption preferentially use a laser fixed on an absorption line as the radiation source. Multiple laser sources may be used to provide narrow linewidth radiation over a wide spectral range.

SUMMARY

A tunable optical frequency comb source includes a linear waveguide having an input leg to couple to a pump laser. A ring microresonator is evanescently coupled to the linear waveguide. The microresonator includes a ring shaped waveguide having a core material with a nonlinear refractive index to provide four-wave mixing to generate a cascade of independent laser beams at frequencies corresponding to the longitudinal modes of the microresonator, wherein one of the cascade of independent laser beams is tuned to a specified frequency corresponding to a frequency of the pump laser based on an operating temperature of the ring microresonator that modifies an optical path length of the ring microresonator.

A method includes providing a pumped laser beam to an input leg of a linear waveguide, evanescently coupling the laser beam to a ring microresonator, generating a cascade of independent laser beams within the microresonator, tuning an optical path length of the microresonator to a selected frequency at an operating temperature, and evanescently coupling the independent laser beams to an output leg of the linear waveguide.

In a further embodiment, a method of tuning an optical filter comb includes modifying a temperature of a ring resonator to modify an optical path length an integral number of wavelengths at a selected frequency, and adjusting a laser coupled to the ring resonator to make its wavelength resonant with the ring resonator having a modified optical path length.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on storage devices, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

An optical frequency comb implemented as a ring microresonator is evanescently coupled to a pump laser propagating in a linear waveguide. The ring microresonator consists of a waveguide having a core material that possesses a nonlinear refractive index capable of four-wave mixing (which implies the material has a nonzero Kerr index). The nonlinear interaction provided by four-wave mixing in the microresonator generates a cascade of independent laser beams at frequencies corresponding approximately to the longitudinal modes of the microresonator propagating simultaneously in the microresonator waveguide. A portion of the radiant power in the cascade of propagating laser beams is also evanescently coupled out of the microresonator into the output leg of the linear waveguide.

The temperature of both the pump laser and the ring microresonator can be independently controlled, for example, by being mounted on its own Peltier device. The wavelength of the pump laser may be tuned to yield one or more wavelengths in the cascade of output wavelengths aligned with absorption peaks of interest. The temperature on the ring microresonator is then adjusted to align one longitudinal mode with the pump laser wavelength. Details of a specific approach based on silicon as the nonlinear waveguide material is provided below, but silicon nitride, silicon dioxide, or gallium arsenide are examples of other candidate materials. This provides an optical frequency comb using a single laser source, wherein the comb is tunable without any mechanical actuation.

Figure 1:
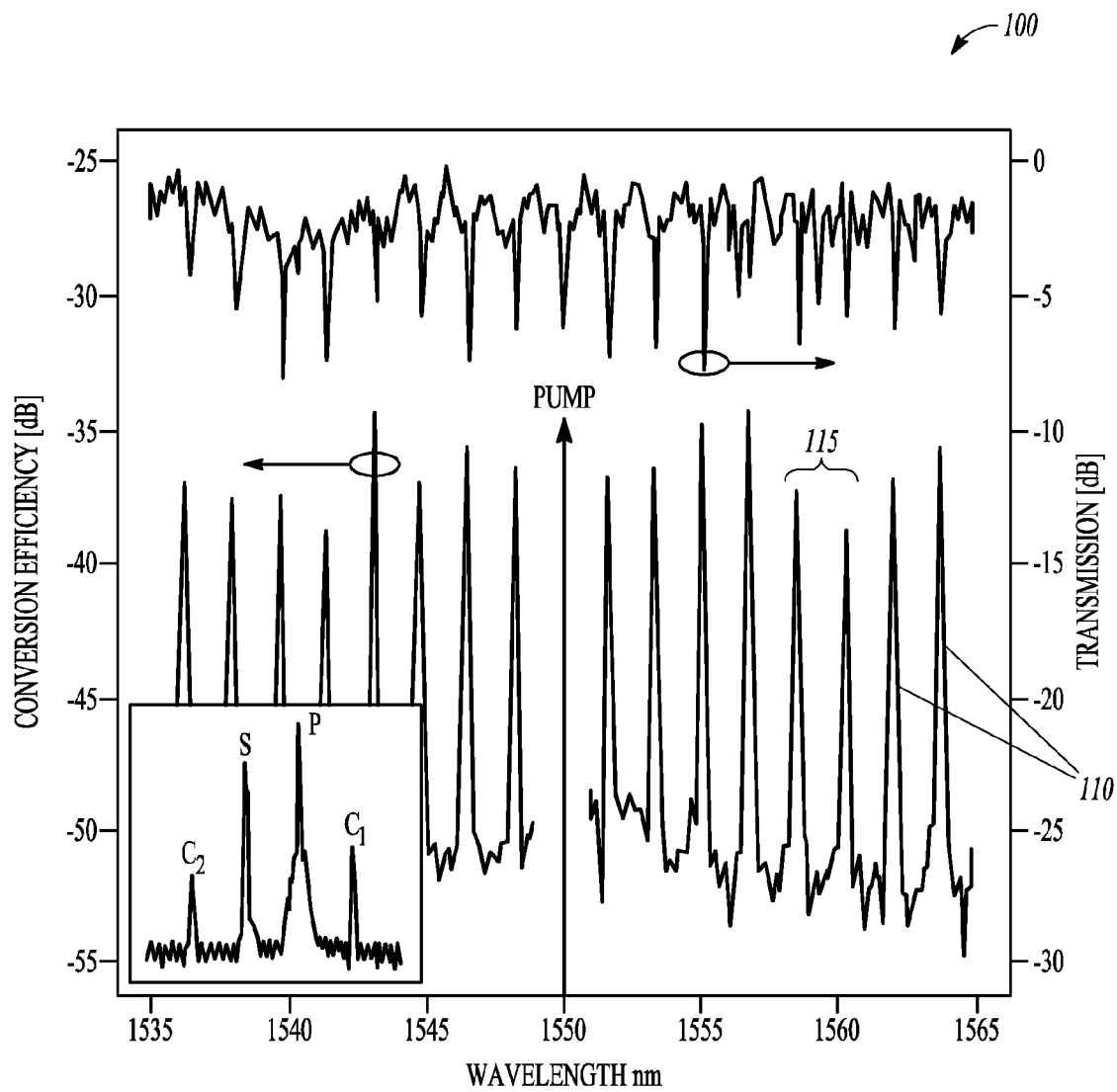
FIG. 1 is a top view of an optical frequency comb resonator according to an example embodiment.

An optical frequency comb (OFC) is a light source consisting of a series of very sharp spectral lines 110 separated by a precisely spaced frequency interval as indicated in a graph 100 in FIG. 1. The concept has been used for a number of significant applications such as an optical clock with atomic clock performance, infrared spectroscopy, and optical waveform and microwave signal synthesis. As originally implemented, generation of an OFC required a mode-locked femtosecond pulsed laser in a high-Q optical resonator, all of which were bulky and expensive. More recently it has been shown that an OFC can be generated with a continuous wave laser in a microresonator made of an optically nonlinear material that supports four-wave mixing. This approach takes advantage of well-established semiconductor lasers and MEMS processing techniques to permit an OFC with a post-age-stamp footprint and thus, combined with a wide variety of interesting practical applications, makes MEMS-enabled OFCs a compelling new technology.

In one embodiment, optical gas absorption is used to define set requirements. Discrete wavelength laser sources may be used to detect a specific chemical species. A fiber-coupled OFC enables the same sensor to detect a large number of chemical species using a single pump laser and thus greatly leverage the market volume.

In one embodiment, optical frequency comb technology may be implemented with MEMS techniques to demonstrate its benefits for the important application of gas sensing. Specifically, existing analytical models for waveguide/resonator using linear optical materials are expanded to the treat the nonlinear Kerr index case. Such mathematical models can be constructed with existing finite-element solvers and enable the design and performance prediction of actual devices.

In one example, a silicon microresonator has a resulting frequency comb around 1550 nm. Practical OFCs can be implemented in microresonators constructed from materials having a large nonlinear refractive index (specifically, a large Kerr index). Devices may be fabricated with conventional MEMS processing techniques, illustrating that OFC is suitable for use as a chip-scale, multi-wavelength laser source in compact, multi-gas sensor.

Figure 2:
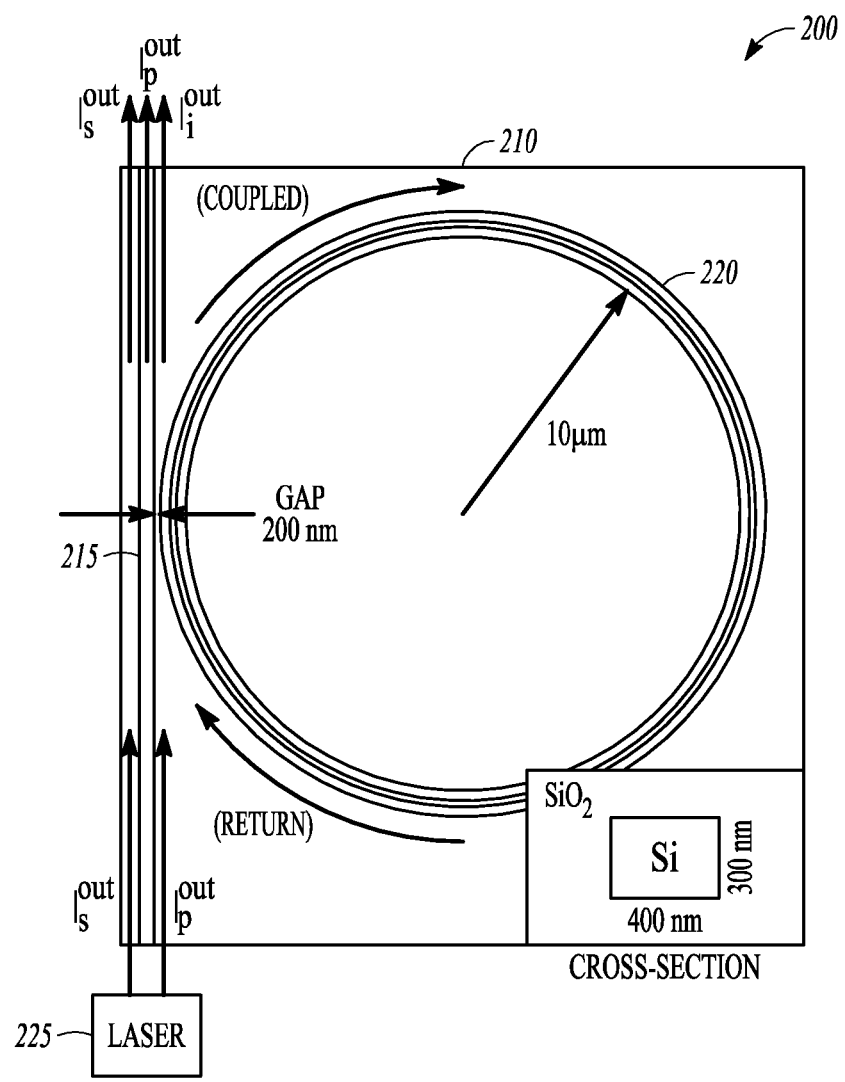
FIG. 2 is a graph indicating spectral lines of the resonator of FIG. 1 according to an example embodiment.

In one embodiment, a comb source is illustrated in a top view at 200 in FIG. 2, a micro-ring resonator 220 is evanescently coupled to linear waveguide 215 which is fabricated in high resistivity silicon. Multiple devices may be fabricated with a range of design parameters, such as waveguide dimensions, microresonator diameter, and waveguide gap.

Loss may be dominated by surface roughness in the walls and free carrier absorption in the core of the resonator 220. The use of high resistivity Si-on-oxide (SOI) wafers 210 and subsequent thermal oxidation of the walls may reduce loss. A laser 225 is coupled to the waveguide 215 to provide laser light to the waveguide 215. To achieve the waveguide features such as a narrow gap and the waveguide lateral dimensions, different methods such as overexposing photoresist or e-beam lithography may be used.

The device 200 is tunable by controlling the temperature of the laser 225 and ring resonator 220 independently to provide a low cost narrow spectral source. This is done routinely for many laser-based gas sensing methods with a Peltier device, which, in fact, is built into the laser package. The ring resonator will be similarly packaged and controlled. With this scheme, the laser wavelength only needs to be adjusted within one free spectral range of the resonator (which is also equal to the comb spacing 115 in FIG. 1). In some example designs, the comb spacing is ~1-2 nm and can be achieved with a temperature change of ~10-20 C in the laser 225 and ~1-2 C in the ring resonator 220 (example—100 um diameter). Alternatively, the wavelength of the laser may be tuned by any of a variety of well-known means, such as an external optical cavity with a rotatable grating (Littman-Metcalf configuration) or an external Fabry-Perot cavity with a movable mirror.

One spectral line in a set of comb lines generated by a microresonator device can be tuned/aligned over a specific spectral line of a gas or other selected frequency in various embodiments. If $f_g$ is the frequency of the gas absorption line or other selected frequency to be measured, then the following expression may be used to tune one of the comb lines to it:

$$f_g = f_{laser} + m \cdot \Delta f,$$

where $f_{laser}$ is the laser frequency $= M \cdot \Delta f$, $\Delta f$ is the comb frequency spacing m=integer (+ or −) corresponding to the closest comb line to $f_g$, M=positive integer typically $\gg |m|$.

$f_{laser}$ and $\Delta f$ can be independently adjusted as described above in paragraph [0020].

The procedure to align the OFC and laser to a specific absorption line in one embodiment is first to modify the temperature of the ring resonator 220 to make the optical path length an integral number (M±m) wavelengths at $f_g$. Then adjust the wavelength of the laser 225 to make its wavelength also resonant with the cavity (i.e., at $f_{laser}$ there will be M wavelengths over the optical path length of the resonator). An example of the maximum temperature changes for each device (laser, ring resonator) in a typical situation were given above.

In some examples, a wide range of tuning may be achieved, such as around 30 nm in one example.

The spectral width spanned by the comb depends on the power of the pump laser 225 (~40 mW in one case) and the Q of the ring resonator 220. A 30 nm range of tuning is quite useful for many gases; for example, NH3, H2O, CO2 can be measured within this span around 1550 nm. A larger ring resonator (225 um) in silicon nitride on Si (Q=300,000) may exhibit a comb spectrum spanning 750 nm, although the interval with equal comb intervals spanned 115 nm. In summary, OFCs have the potential to provide much wider spectral range than currently available in an individual tunable laser, and thus the OFC represents a significant advance in high radiance, multi-spectral, narrow line-width sources.

In various embodiments, the precise wavelengths of the comb lines may be primarily determined by the optical path length of the microresonator. Since optical path length is the product of the microresonator's effective refractive index and the physical length of the microresonator's circumference, the temperature dependence of both refractive index and coefficient of thermal expansion of the microresonator's constituent materials affect the optical path length of the microresonator. The examples below include calculations of sensitivity to temperature tuning due to dependence on temperature of both refractive index and physical length of microresonator.

Figure 3:
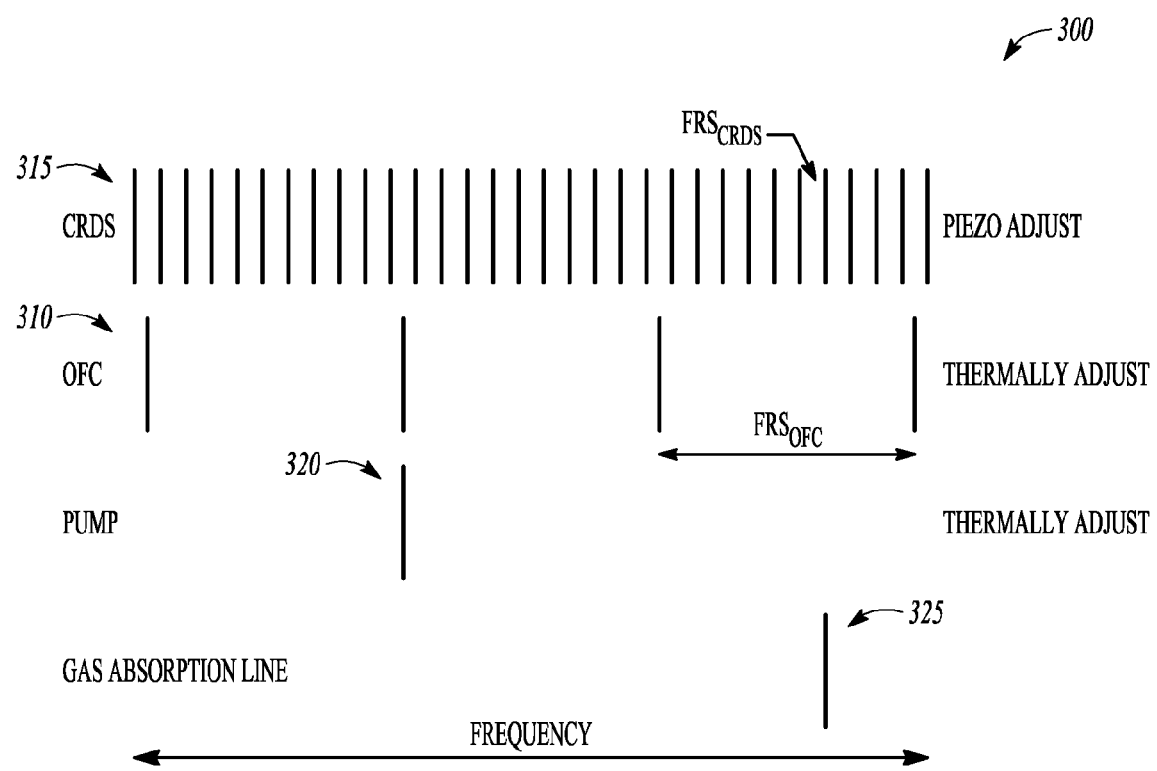
FIG. 3 is a frequency graph illustrating thermal adjustment of an optical frequency comb according to an example embodiment.

In a further example embodiment, the thermal change in $nL_{RT}$ for a silicon OFC (optical frequency comb) is illustrated in a frequency graph at 300 in FIG. 3, given the following data:

$$n(Si, 300K) = 3.4324,$$

$$CTE(Si) = 2.6e\text{-}6/C,$$

$$dn/dT = 1.54e\text{-}4/C,$$

Take a wavelength of 3 um and $nL_{RT}$=300 um; $L_{RT}$=300/3.4324=87.402 um. Then, f(3 um)=100 THz; FSR=$c/nL_{RT}$=1 THz; and FSR (3 um)=(1 THz/100 THz)*3000 nm=30 nm. (FSR=free spectral range.)

For $\Delta T = 1$ C, $$\Delta n \cdot L_{RT} = (1.54e\text{-}4) \cdot (1\ C) \cdot (87.4\ um) = 1.346e\text{-}2\ um;$$

$$n \cdot \Delta L_{RT} = (3.4324) \cdot (87.402) \cdot (2.6e\text{-}6) \cdot (1\ C) = 7.800e\text{-}4\ um;$$

and $$\Delta(nL_{RT}) = 13.45\ nm + 0.78\ nm = 14.4\ nm.$$

The micro-ring OFC 310 and CRDS 315 (cavity ring down spectroscopy) function operation involves a thermally tune OFC and pump laser at 320±0.5$FRS_{OFC}$, with for example $nL_{rt}$=300 μm, λ=3 μm, FSR=30 nm, $\Delta T$=1 C→$\Delta nL_{rt}$=14 nm. This is followed by Piezo-tuning CRDS to specific comb line (~ms) at 325.

A thermal analysis is repeated for Si3N4 and SiO2 waveguides. A set of micro-resonator diameters on the mask is used in the following example:

TABLE 1

$d_{wg}$ = [20 50 100 150 200 300 500] microns.

| Material | CTE [/C] | dn/dT [/C] | n(1500 nm) | density [g/cm3] |
|---|---|---|---|---|
| Si | 2.6e−6 | 2e−4 | 3.43 | 2.33 |
| Si3N4 | 3.2e−6 | 4e−5 | 1.985 | 3.2 |
| SiO2 | 0.55e−6 | 8.4e−6 | 1.455 | 2.2 |

The resonator physical pathlength is: $L_{RT} = \pi \cdot d_{wg}$, and the change in physical length is $\Delta L_{RT} = CTE \cdot L_{RT} \cdot \Delta T = \pi \cdot CTE \cdot d_{wg} \cdot \Delta T$. The change ($\Delta$) in optical pathlength (n $L_{RT}$) is:

$$\Delta(nL_{RT}) = n \cdot \Delta L_{RT} + (dn/dT) \cdot L_{RT} \Delta T = n \cdot CTE \cdot L_{RT} \cdot T + (dn/dT) \cdot L_{RT} \cdot \Delta T,$$

$$\Delta(nL_{RT}) = CTE \cdot (n \cdot L_{RT}) \cdot \Delta T + (dn/dT)/n \cdot (n \cdot L_{RT}) \cdot \Delta T,$$

and $$\Delta(nL_{RT})/(n \cdot L_{RT}) = CTE \cdot \Delta T + [(dn/dT)/n] \cdot \Delta T$$

The following Table 2 illustrates micro-resonator length change with 1 C temperature change

TABLE 2

| | Physical path change, $\Delta L_{RT}$ [nm] | | | Optical path change, $\Delta(nL_{RT})$ [nm] | | |
|---|---|---|---|---|---|---|
| $d_{wg}$ [µm] | Si | Si3N4 | SiO2 | Si | Si3N4 | SiO2 |
| 20 | 0.16 | 0.20 | 0.03 | 13.1 | 2.9 | 0.6 |
| 50 | 0.41 | 0.50 | 0.09 | 32.8 | 7.3 | 1.4 |
| 100 | 0.82 | 1.01 | 0.17 | 65.6 | 14.6 | 2.9 |
| 150 | 1.23 | 1.51 | 0.26 | 98.5 | 21.8 | 4.3 |
| 200 | 1.63 | 2.01 | 0.35 | 131.3 | 29.1 | 5.8 |
| 300 | 2.45 | 3.02 | 0.52 | 196.9 | 43.7 | 8.7 |
| 500 | 4.08 | 5.03 | 0.86 | 328.2 | 72.8 | 14.5 |

The FSR (nm) at 1500 nm wavelength is calculated for each of the $\Delta(nL_{RT})$ cases above. The range of laser tunability is governed by the FSR in the above table; the laser should be capable of being tuned over ±0.5FSR with a precision that is a fraction of FWHM of a gas absorption line, which is 3-5 GHz at 1 atm.

In the following table, FSR (Hz)=c/(n $L_{RT}$).

TABLE 3

| | Optical Path Length ($nL_{RT}$) [µm] | | | FSR [GHz] | | |
|---|---|---|---|---|---|---|
| $d_{wg}$ [µm] | Si | Si3N4 | SiO2 | Si | Si3N4 | SiO2 |
| 20 | 215.51 | 124.72 | 91.42 | 1392.03 | 2405.36 | 3281.55 |
| 50 | 538.78 | 311.80 | 228.55 | 556.81 | 962.15 | 1312.62 |
| 100 | 1077.57 | 623.61 | 457.10 | 278.41 | 481.07 | 656.31 |
| 150 | 1616.35 | 935.41 | 685.65 | 185.60 | 320.72 | 437.54 |
| 200 | 2155.13 | 1247.21 | 914.20 | 139.20 | 240.54 | 328.15 |
| 300 | 3232.70 | 1870.82 | 1371.31 | 92.80 | 160.36 | 218.77 |
| 500 | 5387.83 | 3118.03 | 2285.51 | 55.68 | 96.21 | 131.26 |

In terms of wavelength, 1500 nm=200 THz, c=3e5 nm·THz, so FSR (nm)=FSR (THz)*(1500 nm)/200 THz= [3e5/(n $L_{RT}$)]*1500 nm/200 THz To find out how tightly the temperature of the microresonator is controlled to keep a cavity resonance fixed on a gas absorption line, proceed as follows:

At a given resonance, $m \cdot \lambda_m = nL_{RT} = OPL = m \cdot c/f_m$. So, $m \cdot c = f_m \cdot OPL$, and at a fixed cavity resonance this is a constant, so taking differentials gives $0 = \delta f_m \cdot OPL + f_m \cdot \delta OPL$, or $\delta f_m/f_m = -\delta OPL/OPL$.

This leads to $\delta OPL/OPL = \delta(nL_{RT})/(n \cdot L_{RT}) = CTE \cdot \delta T + [(dn/dT)/n] \cdot \delta T$, and from which we the required temperature control may be obtained.

The micro-resonator resonance FWHM in frequency is given by $\delta f_m = FSR/F$, where F is the cavity finesse.

Reasonable values for the FSR from the above table is 500-1000 GHz, and the loss ~1/200, so the finesse ~1000. Therefore, a reasonable ballpark value for $\delta f_m$ is 0.5-1 GHz, which also agrees with the value determined from considering the gas absorption linewidth.

Now, $\delta f_m \sim 1$ Ghz, $f_m \sim 200$ THz=200,000 GHz.

Therefore, $\delta f_m/f_m \sim 5e-6$, and $\delta T \sim 5e-6/[CTE+(dn/dT)/n]$, as seen in the following table.

TABLE 4

| Material | CTE [C$^{-1}$] | n @ 1500 nm | dn/dT [C$^{-1}$] | CTE + dlog(n)/dT | δT [C] |
|---|---|---|---|---|---|
| Si | 2.6 × 10$^{-6}$ | 3.43 | 2 × 10$^{-4}$ | 6.09 × 10$^{-5}$ | 0.082 |
| Si$_3$N$_4$ | 3.2 × 10$^{-6}$ | 1.985 | 4 × 10$^{-5}$ | 2.34 × 10$^{-5}$ | 0.214 |
| SiO$_2$ | 0.55 × 10$^{-6}$ | 1.455 | 8.4 × 10$^{-6}$ | 6.32 × 10$^{-6}$ | 0.791 |

To tune a micro-resonator to a fixed wavelength laser (say 1512.232 um), first find the FSR of the resonator.

FSR (Hz)=c/(n$L_{RT}$), where c=3×10$^8$ m/s, n=refractive index of waveguide core (1.985), and $L_{RT}$=roundtrip path of ring (circumference).

Table 3 has this calculated. For example, for Si3N4 and 100 um diameter, FSR (Hz)=481.07 GHz. The frequency of the input laser (1512.232 nm=198,382.26 GHz) will lie no more than ±0.5*FSR (Hz) from a resonant mode of the microresonator. That means the microresonator may be thermally tuned no more than ±240.54 GHz from its ambient initial point. The table above shows that a temperature change of 0.214 C changes the resonance mode by 1 GHz, so a significant temperature change may be needed to cover one FSR. This suggests that changing the laser wavelength may be an easier method.

Figure 4:
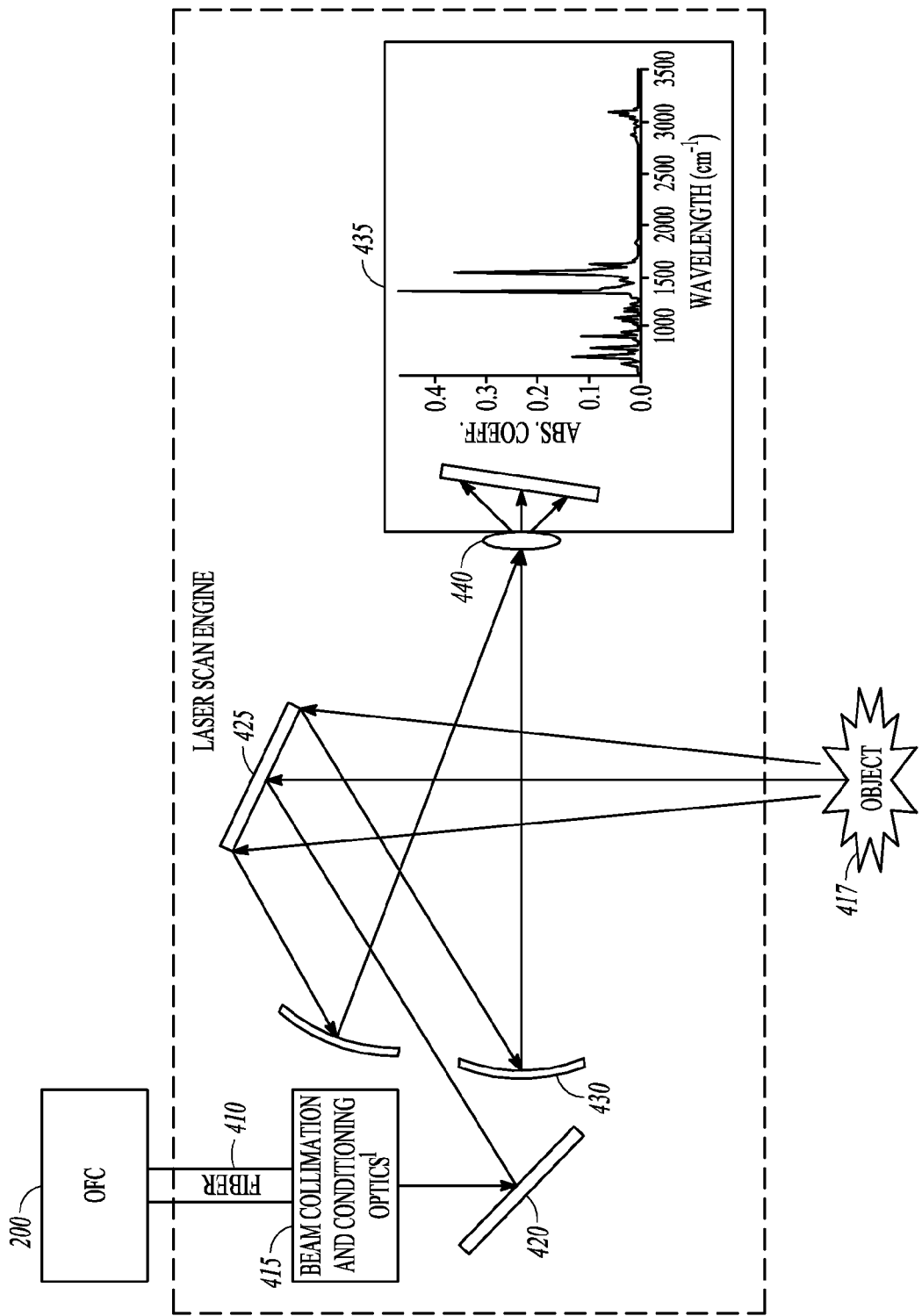
FIG. 4 is a block diagram of a system for sensing an object utilizing an optical frequency comb source according to an example embodiment.

FIG. 4 is a block diagram of an example system 400 utilizing a comb source 200 to provide a multi-spectral laser beam. The laser beam is provided via an optical fiber link 410 to beam collimation and conditioning optics 415 to shape the multi-spectral laser beam to achieve an adequate focus over a depth of field required for an application. In this case, the application implemented by system 400 is for detection of an object 417, which may be a gas having a specific adsorption line.

The collimated and conditioned beam is provided to a mirror 420, such as a fold mirror that may be flat or may have some optical power depending on the application. The beam is reflected by the mirror 420 and directed toward a scan mirror 425, where it is reflected toward the object 417. Part of the beam is reflected from the object and received again by scan mirror 425, directed to an off-axis mirror 430, from which it is directed toward an input port of a spectrometer 435 having an input port 440.

In some embodiments, the off-access mirror 430 allows the beam from fold mirror 420 to initially pass through it, and then focuses radiation received from the object 417 onto the input port 440. The mirror 430 may include a diffraction grating to disperse the radiation by wavelength over a detector array in spectrometer 435. The spectrometer 435 alternatively is provided the radiation via a fiber on which the mirror 430 focuses the radiation. Mirror 430 thus serves as a collection mirror.

Mirror 425 may be a fixed or a scanning type of mirror depending on different applications. Spectrometer 435 may include a linear detector array with electronics built into a scan engine to directly measure the spectrum provided by the collection mirror 430 via an input port or via a fiber on which the collection mirror focuses radiation received from the object 417.

The comb source 200, as above, includes a pump laser source, micro resonator cavity with waveguide input, and coupling optics. In some embodiments, the comb source 200 comprises an optical frequency comb that generates infrared radiation which is invisible to a human. To aid in pointing the radiation toward the object 417, a separate laser beam may be folded coincidentally onto the optical frequency comb infrared radiation.

Examples

1. A tunable optical frequency comb source comprising:
   a linear waveguide having an input leg to couple to a pump laser;
   a ring microresonator evanescently coupled to the linear waveguide, the microresonator including a ring shaped waveguide having a core material with a nonlinear refractive index to provide four-wave mixing to generate a cascade of independent laser beams at frequencies corresponding to the longitudinal modes of the microresonator, wherein one of the cascade of independent laser beams is tuned to a specified frequency corresponding to a frequency of the pump laser based on an operating temperature of the ring microresonator that modifies an optical path length of the ring microresonator.

2. The tunable optical frequency comb source of example 1 wherein a portion of radiant power in the cascade of independent laser beams is evanescently coupled into an output leg of the linear waveguide.

3. The tunable optical frequency comb source of any of examples 1-2 wherein each of the linear waveguide and the ring microresonator are mounted on independent Peltier devices.

4. The tunable optical frequency comb source of any of examples 1-3 wherein the core material comprises high resistivity silicon.

5. The tunable optical frequency comb source of any of examples 1-4 wherein the core material includes at least one of silicon dioxide and gallium arsenide.

6. The tunable optical frequency comb source of any of examples 1-5 and further comprising:
   first optics to receive laser beams provided by the ring microresonator;
   second optics to direct the laser beams toward an object and receive reflected radiation from the object.

7. The tunable optical frequency comb source of example 6 and further comprising a spectrometer coupled to receive the reflected radiation from the second optics.

8. A method comprising:
   providing a pumped laser beam to an input leg of a linear waveguide;
   evanescently coupling the laser beam to a ring microresonator;
   generating a cascade of independent laser beams within the microresonator;
   tuning an optical path length of the microresonator to a selected frequency at an operating temperature; and
   evanescently coupling the independent laser beams to an output leg of the linear waveguide.

9. The method of example 8 and further comprising tuning the pumped laser to the selected frequency.

10. A method of tuning an optical filter comb comprising:
    modifying a temperature of a ring resonator to modify an optical path length an integral number of wavelengths at a selected frequency; and
    adjusting a laser coupled to the ring resonator to make its wavelength resonant with the ring resonator having a modified optical path length.

11. The method of example 10 wherein the selected frequency comprises a selected absorption line of a gas of interest.

12. The method of example 11 wherein the optical path length is modified an integral number (M±m) wavelengths at the selected frequency.

13. The method of example 12 wherein the laser wavelength is adjusted such that there are M wavelengths over the optical path length of the resonator.

14. The method of any of examples 10-13 wherein the laser has an adjustable frequency.

15. The method of any of examples 10-14 wherein the laser frequency is adjusted by adjusting a temperature of the laser.

16. The method of any of examples 10-15 wherein $f_g$ is the selected frequency to be measured, and wherein the ring resonator has multiple comb lines.

17. The method of example 16 wherein the following expression is used to tune one of the comb lines:

$$f_g = f_{laser} + m * \Delta f,$$

where $f_{laser}$ is the laser frequency=$M*\Delta f$, $\Delta f$ is the comb frequency spacing, m=integer (+ or −) corresponding to the closest comb line to $f_g$, and M=positive integer typically $>>|m|$.

18. The method of example 17 wherein $f_{laser}$ and $\Delta f$ are independently adjusted by changing the temperature of the laser and the ring resonator.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A tunable optical frequency comb source comprising:
   a linear waveguide having an input leg to couple to a pump laser;
   a ring microresonator evanescently coupled to the linear waveguide, the microresonator including a ring shaped waveguide having a core material with a nonlinear refractive index to provide four-wave mixing to generate a cascade of independent laser beams at frequencies corresponding to the longitudinal modes of the microresonator, wherein one of the cascade of independent laser beams is tuned to a specified frequency corresponding to a frequency of the pump laser based on an operating temperature of the ring microresonator that modifies an optical path length of the ring microresonator.

2. The tunable optical frequency comb source of claim 1 wherein a portion of radiant power in the cascade of independent laser beams is evanescently coupled into an output leg of the linear waveguide.

3. The tunable optical frequency comb source of claim 1 wherein each of the linear waveguide and the ring microresonator are mounted on independent Peltier devices.

4. The tunable optical frequency comb source of claim 1 wherein the core material comprises high resistivity silicon.

5. The tunable optical frequency comb source of claim 1 wherein the core material includes at least one of silicon dioxide and gallium arsenide.

6. The tunable optical frequency comb source of claim 1 and further comprising:
   first optics to receive laser beams provided by the ring microresonator;
   second optics to direct the laser beams toward an object and receive reflected radiation from the object.

7. The tunable optical frequency comb source of claim 6 and further comprising a spectrometer coupled to receive the reflected radiation from the second optics.

8. A method comprising:
   providing a pumped laser beam to an input leg of a linear waveguide;
   evanescently coupling the laser beam to a ring microresonator having a nonlinear refractive index;
   generating a cascade of independent laser beams within the microresonator;
   tuning an optical path length of the microresonator to a selected frequency at an operating temperature; and
   evanescently coupling the independent laser beams to an output leg of the linear waveguide.

9. The method of claim 8 and further comprising tuning the pumped laser to the selected frequency.

10. A method of tuning an optical filter comb comprising:
    modifying a temperature of a non-linear refractive index ring resonator to modify an optical path length of the ring resonator an integral number of wavelengths at a selected frequency; and
    adjusting a laser coupled to the ring resonator to make the wavelength of the laser resonant with the ring resonator having a modified optical path length.

11. The method of claim 10 wherein the selected frequency comprises a selected absorption line of a gas of interest.

12. The method of claim 11 wherein the optical path length is modified an integral number (M±m) wavelengths at the selected frequency.

13. The method of claim 12 wherein the laser wavelength is adjusted such that there are M wavelengths over the optical path length of the resonator.

14. The method of claim 10 wherein the laser has an adjustable frequency.

15. The method of claim 10 wherein the laser frequency is adjusted by adjusting a temperature of the laser.

16. The method of claim 10 wherein $f_g$ is the selected frequency to be measured, and wherein the ring resonator has multiple comb lines.

17. The method of claim 16 wherein the following expression is used to tune one of the comb lines:

$$f_g = f_{laser} + m*\Delta f,$$

where $f_{laser}$ is the laser frequency=$M*\Delta f$, $\Delta f$ is the comb frequency spacing, m=integer (+ or −) corresponding to the closest comb line to $f_g$, and M=positive integer typically $>>|m|$.

18. The method of claim 17 wherein $f_{laser}$ and $\Delta f$ are independently adjusted by changing the temperature of the laser and the ring resonator.

* * * * *